United States Patent
Tang et al.

(10) Patent No.: US 12,348,881 B2
(45) Date of Patent: Jul. 1, 2025

(54) IMAGE SENSING DEVICE AND IMAGE SENSING METHOD

(71) Applicant: PIXART IMAGING INC., Hsin-Chu (TW)

(72) Inventors: Kuan Tang, Hsin-Chu (TW); Jui-Te Chiu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 194 days.

(21) Appl. No.: 18/220,320

(22) Filed: Jul. 11, 2023

(65) Prior Publication Data
US 2025/0024179 A1    Jan. 16, 2025

(51) Int. Cl.
*H04N 25/445* (2023.01)
*H04N 25/42* (2023.01)
*H04N 25/585* (2023.01)
*H04N 25/78* (2023.01)

(52) U.S. Cl.
CPC ........... *H04N 25/445* (2023.01); *H04N 25/42* (2023.01); *H04N 25/585* (2023.01); *H04N 25/78* (2023.01)

(58) Field of Classification Search
CPC ...... H04N 25/40; H04N 25/42–25/445; H04N 25/585; H04N 25/78
See application file for complete search history.

(56) References Cited

U.S. PATENT DOCUMENTS

| | | | | |
|---|---|---|---|---|
| 10,834,350 | B2 * | 11/2020 | Totsuka | H04N 25/78 |
| 2011/0221941 | A1 * | 9/2011 | Sato | H04N 25/778 |
| | | | | 348/E5.022 |
| 2023/0283918 | A1 * | 9/2023 | Zhou | H10F 39/8053 |
| | | | | 348/301 |

* cited by examiner

*Primary Examiner* — Lin Ye
*Assistant Examiner* — Chriss S Yoder, III
(74) *Attorney, Agent, or Firm* — Li & Cai Intellectual Property (USA) Office (57) ABSTRACT

An image sensing device and an image sensing method are provided. The image sensing device includes a pixel array, first row-selecting lines, second row-selecting lines and a control circuit. Pixels in the pixel array are arranged to form a plurality of rows and a plurality of columns. A first set of the pixels of each row is electrically connected to the corresponding first row-selecting line, and a second set of the pixels of each row is electrically connected to the corresponding second row-selecting line. The control circuit performs an HFR readout process to obtain an image frame. The rows are divided into a selectable portion and an unselectable portion. In each of HFR readout periods, the first set of an unselected first row and the second set of an unselected second row are selected from the selectable portion of the rows.

20 Claims, 5 Drawing Sheets

IMAGE SENSING DEVICE AND IMAGE SENSING METHOD

FIELD OF THE DISCLOSURE

The present disclosure relates to a device and a method, and more particularly to an image sensing device and an image sensing method.

BACKGROUND OF THE DISCLOSURE

For the existing image sensing chips, a frame rate is an important characteristic that needs be increased or kept to a certain extent so as to meet requirements for higher resolutions in recent years.

In general, the frame rate depends on the number of pixel rows of the image sensing chip, as well as a period of time required for reading one pixel row. Normally, the frame rate doubles when the resolution is halved in height (the number of pixel rows) and width (the number of pixel columns).

For example, if the frame rate under the resolution of 1280×800 is 60 Frame per second (FPS), then the frame rate under the resolution of 640×400 can reach 120 FPS. However, there is an urgent needs in achieving higher frame rates under such resolutions.

SUMMARY OF THE DISCLOSURE

In response to the above-referenced technical inadequacies, the present disclosure provides an image sensing device and an image sensing method capable of further increasing the frame rate under the existing resolution In one aspect, the present disclosure provides an image sensing device, which includes a pixel array, a plurality of first row-selecting lines, a plurality of second row-selecting lines and a control circuit. Pixels in the pixel array are arranged to form a plurality of rows and a plurality of columns. The plurality of first row-selecting lines correspond to the plurality of rows, respectively, and a first set of the pixels of each row is electrically connected to the corresponding first row-selecting line. The plurality of second row-selecting lines correspond to the rows, respectively, and a second set of the pixels of each row is electrically connected to the corresponding second row-selecting line. The control circuit is configured to, in response to a high-frame rate (HFR) mode being enabled, perform an HFR readout process to obtain an image frame. The HFR readout process includes a plurality of HFR readout periods, and the plurality of rows are divided into a selectable portion and an unselectable portion for the HFR readout process. In each of the HFR readout periods, the control circuit is configured to select the first set of the pixels of an unselected first row and the second set of the pixels of an unselected second row adjacent to the unselected first row from the selectable portion of the rows, and read out signals of the selected pixels. The unselectable portion of the rows is not selected in the HFR readout process.

In another aspect, the present disclosure provides an image sensing method adapted to an image sensing device, the image sensing device including a pixel array in which pixels are arranged to form a plurality of rows and a plurality of columns, a plurality of first row-selecting lines, a plurality of second row-selecting lines and a control circuit, and the image sensing method includes: configuring the control circuit configured to, in response to a high-frame rate (HFR) mode being enabled, perform an HFR readout process to obtain an image frame, in which the HFR readout process includes a plurality of HFR readout periods, a first set of the pixels of each row is electrically connected to the corresponding first row-selecting line, a second set of the pixels of each row is electrically connected to the corresponding second row-selecting line, and the plurality of rows are divided into a selectable portion and an unselectable portion for the HFR readout process; and configuring the control circuit to, in each of the HFR readout periods, select the first set of the pixels of an unselected first row and the second set of the pixels of an unselected second row adjacent to the unselected first row from the selectable portion of the rows, and read out signals of the selected pixels, in which the unselectable portion of the rows is not selected in the HFR readout process.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
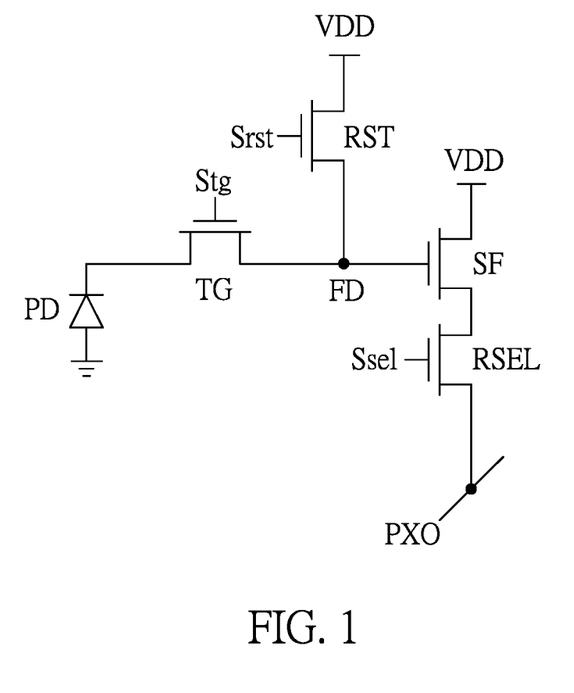
FIG. 1 is a circuit layout of a pixel according to one embodiment of the present disclosure.
Figure 2:
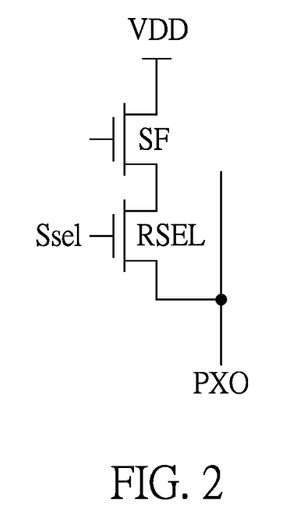
FIG. 2 is a simplified circuit layout of the pixel of FIG. 1.
Figure 3:
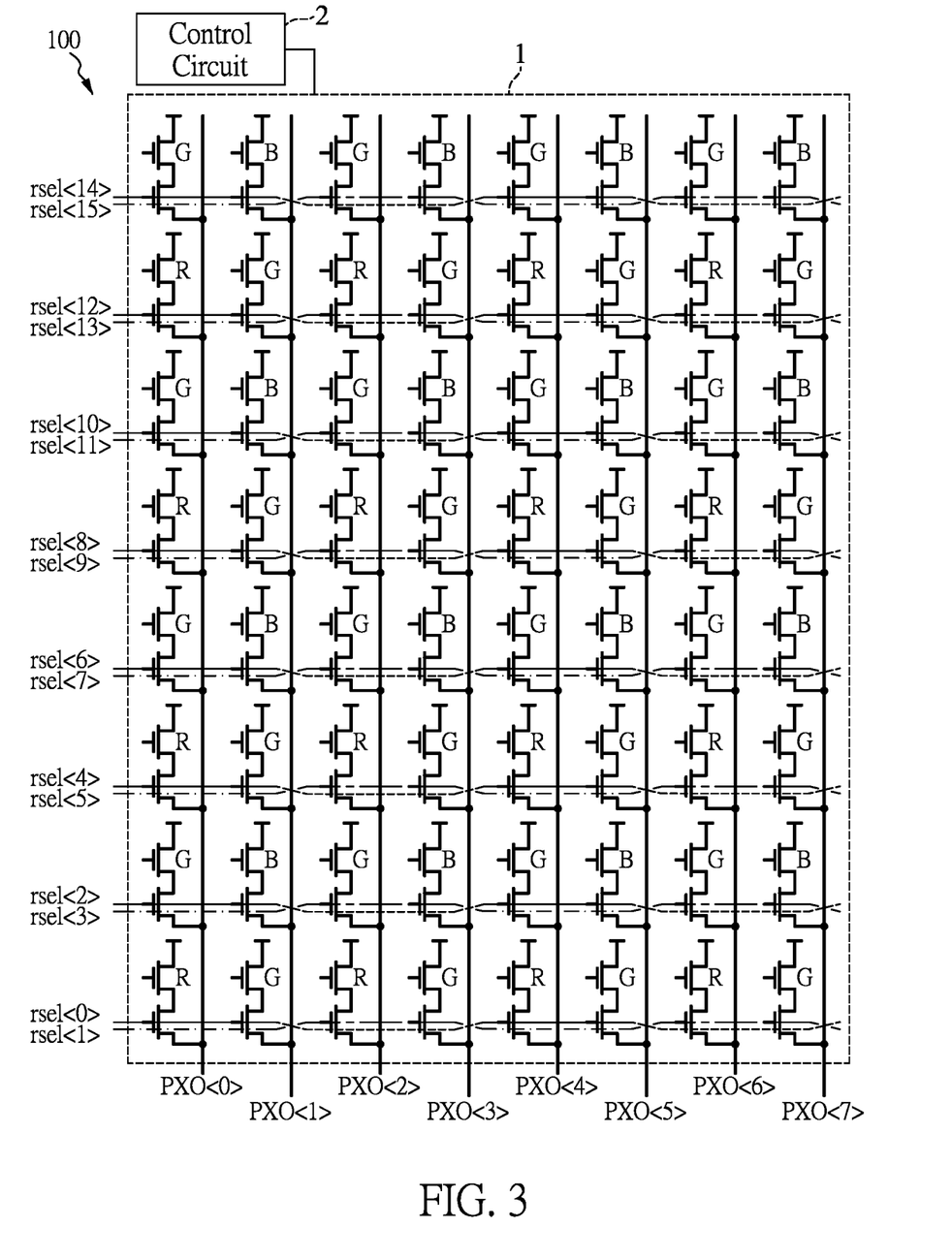
FIG. 3 is a schematic diagram showing a control circuit and a pixel array according to one embodiment of the present disclosure.

FIG. 1 is a circuit layout of a pixel according to one embodiment of the present disclosure, FIG. 2 is a simplified circuit layout of the pixel of FIG. 1, and FIG. 3 is a schematic diagram showing a control circuit and a pixel array according to one embodiment of the present disclosure.

Referring to FIGS. 1 to 3, one embodiment of the present disclosure provides an image sensing device 100, which includes a pixel array 1, first row-selecting lines rsel<0>, rsel<2>, rsel<14>, second row-selecting lines rsel<1>, rsel<3>, . . . rsel<15>, and a control circuit 2.

In the pixel array 1, multiple pixels R, G, B in the pixel array 1 are arranged to form a plurality of rows and a plurality of columns. For example, the pixel array 1 shown in FIG. 3 includes 8 rows and 8 columns, but the present disclosure is not limited thereto. The first row-selecting lines rsel<0>, rsel<2>, . . . rsel<14> correspond to the rows, respectively, and similarly, the second row-selecting lines rsel<1>, rsel<3>, . . . rsel<15> correspond to the rows, respectively.

The image sensing device 100 further includes readout lines PXO<0> to PXO<7> electrically connected to the control circuit 2. The readout lines PXO<0> to PXO<7> correspond to the columns, respectively, and the pixels R, G and/or B of each column are electrically connected to the corresponding readout line PXO<0>, PXO<1>, . . . , or PXO<7>.

As shown in FIG. 1, each of the pixels R, G, B can be a 4T CMOS pixel, which includes a photodiode PD, a holding transistor TG, a reset transistor RST, a source follower transistor SF and a row selecting switch (transistor) RS.

The holding transistor TG has one end connected to the photodiode PD and another end connected to the floating diffusion node FD. The reset transistor RST is coupled between a common voltage source VDD and the floating diffusion node FD. The source follower transistor SF has one end connected to the common voltage source VDD, and another end connected to one end of the row selecting transistor RS. The row selecting transistor RSEL is electrically connected between the photodiode PD and the corresponding readout line PXO, and more specifically, the row selecting transistor RSEL is electrically connected between the source follower transistor SF and the readout line PXO.

It should be noted that in FIG. 3, each of the pixels R, G, B is simplified into a pixel circuit shown in FIG. 2, in which only the source follower transistor SF, the row selecting transistor RSEL and the readout line PXO are kept.

During a pixel readout period triggered by the control circuit 2, the photodiode PD is configured to receive optical energy and generate corresponding charges, the holding transistor TG is turned on by a holding signal Stg, the reset transistor RST is turned off by a reset signal Srst, and the row selecting transistor RS is enabled by a selecting signal Ssel to sample a reset voltage of a floating diffusion node FD in response to the pixel being selected, such that a signal of the selected pixel can be read out by the control circuit 2.

The control circuit 2 can be a microprocessor that incorporates the functions of a central processing unit on a single integrated circuit (IC), or at least a few integrated circuits.

In the existing image sensing device, an arrangement of a general sensing array can include an 8×8 pixel array similar to FIG. 3. Basically, the pixels on a column are connected to the same readout line, and each pixel row share the same row selecting signal. If there is a demand for a high frame rate, a usual practice is to reduce a frame resolution to achieve a higher frame rate. For example, However, the frame rate may be limited in such control scheme.

To further increase the frame rate under the reduced frame resolution, the present disclosure utilizes an arrangement of row selecting lines. As shown in FIG. 3, a first set of the pixels of each row is electrically connected to the corresponding first row-selecting line rsel<0>, rsel<2>, . . . , or rsel<14> through the row selecting transistor RSEL, a second set of the pixels of each row is electrically connected to the corresponding second row-selecting line rsel<1>, rsel<3>, or rsel<15> through the row selecting transistor RSEL.

For example, the first set of the pixels can include the pixels R, G, B connected to the readout lines PXO<0>, PXO<1>, PXO<4> and PXO<5>, respectively, and the second set of the pixels can include the pixels R, G, B connected to the readout lines PXO<2>, PXO<3>, PXO<6> and PXO<7>, respectively.

For each row, the first set of the pixels (i.e., the pixels R, G, B respectively connected to the readout lines PXO<0>, PXO<1>, PXO<4> and PXO<5>) and the second set of the pixels (i.e., the pixels R, G, B respectively connected to the readout lines PXO<2>, PXO<3>, PXO<6> and PXO<7>) are alternately and repeatedly arranged in a two-by-two manner.

Moreover, for each of adjacent two of the rows, the first set and the second set in a first row each includes first pixels and second pixels that are alternately arranged, the first set and the second set in a second row each includes third pixels and fourth pixels that are alternately arranged, and the second pixels and the third pixels corresponding to a first optical wavelength. In some embodiments, the first pixels corresponding to a second optical wavelength, the fourth pixels corresponding to a third optical wavelength, and the first optical wavelength, the second optical wavelength and the third optical wavelength can be corresponding to green, blue, and red, respectively. It should be noted that the color that each of the pixels R, G, B corresponds to represents the color the photodiode PD provided therein being set to detect. In other embodiment, the pixels corresponding to invisible optical wavelength can also be applied.

The arrangement of FIG. 3 is taken as an example. In FIG. 3, for first and second rows (i.e., the lowest row and a row next to the lowest row), the first set of the pixels and the second set of pixels in the first row each includes the red pixels R and the green pixels G that are alternately arranged, and the first set and the second set in the second row each includes the green pixels G and the blue pixels that are alternately arranged.

Furthermore, for the first row of the pixels (the lowest row in FIG. 3), the pixels R, G respectively connected to the readout lines PXO<0>, PXO<1>, PXO<4> and PXO<5> are connected to the corresponding first row-selecting line rsel<0>, and the pixels R, G respectively connected to the readout lines PXO<2>, PXO<3>, PXO<6> and PXO<7> are connected to the corresponding second row-selecting line rsel<1>.

Similarly, for a second row of the pixels (a row next to the lowest row in FIG. 3), the pixels G, B respectively connected to the readout lines PXO<0>, PXO<1>, PXO<4> and PXO<5> are connected to the corresponding first row-selecting line rsel<0>, and the pixels G, B respectively connected to the readout lines PXO<2>, PXO<3>, PXO<6> and PXO<7> are connected to the corresponding second row-selecting line rsel<1>.

In this arrangement, the control circuit 2 can be configured to, in response to a normal readout mode being enabled, perform a normal readout process including a plurality of normal readout periods.

In each of the normal readout periods, a first set and a second set of the pixels of an unselected row can be selected to read out signals of the selected pixels.

For example, in a first one of the normal readout periods, the unselected row can be the first through eighth rows of the pixel array 1. In this case, the first row is selected first, thus the first set that is selected by the control circuit 2 in the first normal readout period can be the pixels R, G respectively connected to the readout lines PXO<0>, PXO<1>, PXO<4> and PXO<5> in the first row, and the second set that is selected in the first normal readout period can be the pixels R, G in the first row respectively connected to the readout lines PXO<2>, PXO<3>, PXO<6> and PXO<7>. Therefore, signals of the selected pixels, which are the pixels R, G in the first row, are read out by the control circuit 2, can the control circuit 2 can obtain image data at locations corresponding to the selected pixels in a current frame.

In a second one of the normal readout periods, the unselected row can now be the second through eighth rows of the pixel array 1. In this case, the second row is selected, thus the first set that is selected by the control circuit 2 in the first normal readout period can be the pixels G, B respectively connected to the readout lines PXO<0>, PXO<1>, PXO<4> and PXO<5> in the second row, and the second set that is selected in the first normal readout period can be the pixels G, B in the second row respectively connected to the readout lines PXO<2>, PXO<3>, PXO<6> and PXO<7>. Therefore, signals of the selected pixels, which are the pixels G, B in the first row, are read out by the control circuit 2. After the normal readout period is repeated until there is no more unselected rows can be selected from the pixel array 1, the control circuit 2 can obtain image data of all the pixels R, G, B to obtain an image frame corresponding to a first resolution.

Figure 4:
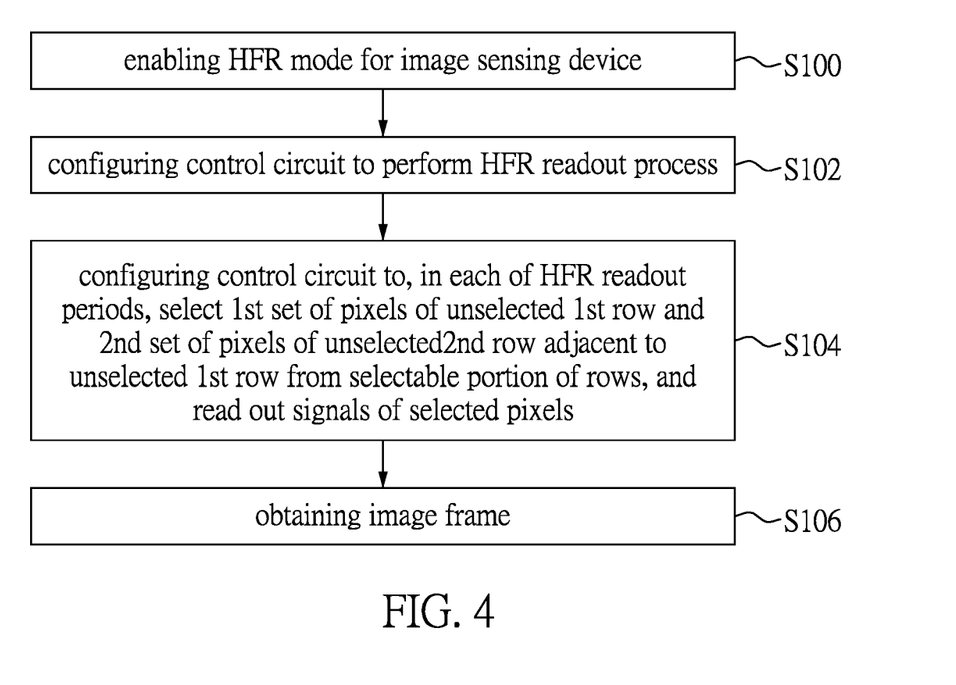
FIG. 4 is a flowchart of an image sensing method according to the present disclosure.

Reference can be made to FIG. 4, which is a flowchart of an image sensing method according to the present disclosure. In another aspect, the present disclosure further provides an image sensing method that can be applied to the image sensing device shown in FIG. 3, but the present disclosure is not limited thereto. As shown in FIG. 3, the image sensing method can include the following steps:

Step S100: enabling a high-frame rate (HFR) mode for the image sensing device.

In response to the HFR mode being enabled, the image sensing method proceeds to step S102: configuring the control circuit to perform an HFR readout process.

In step S102, the HFR readout process can include a plurality of HFR readout periods, and the rows of the pixel array 1 are divided into a selectable portion and an unselectable portion for the HFR readout process.

Figure 5:
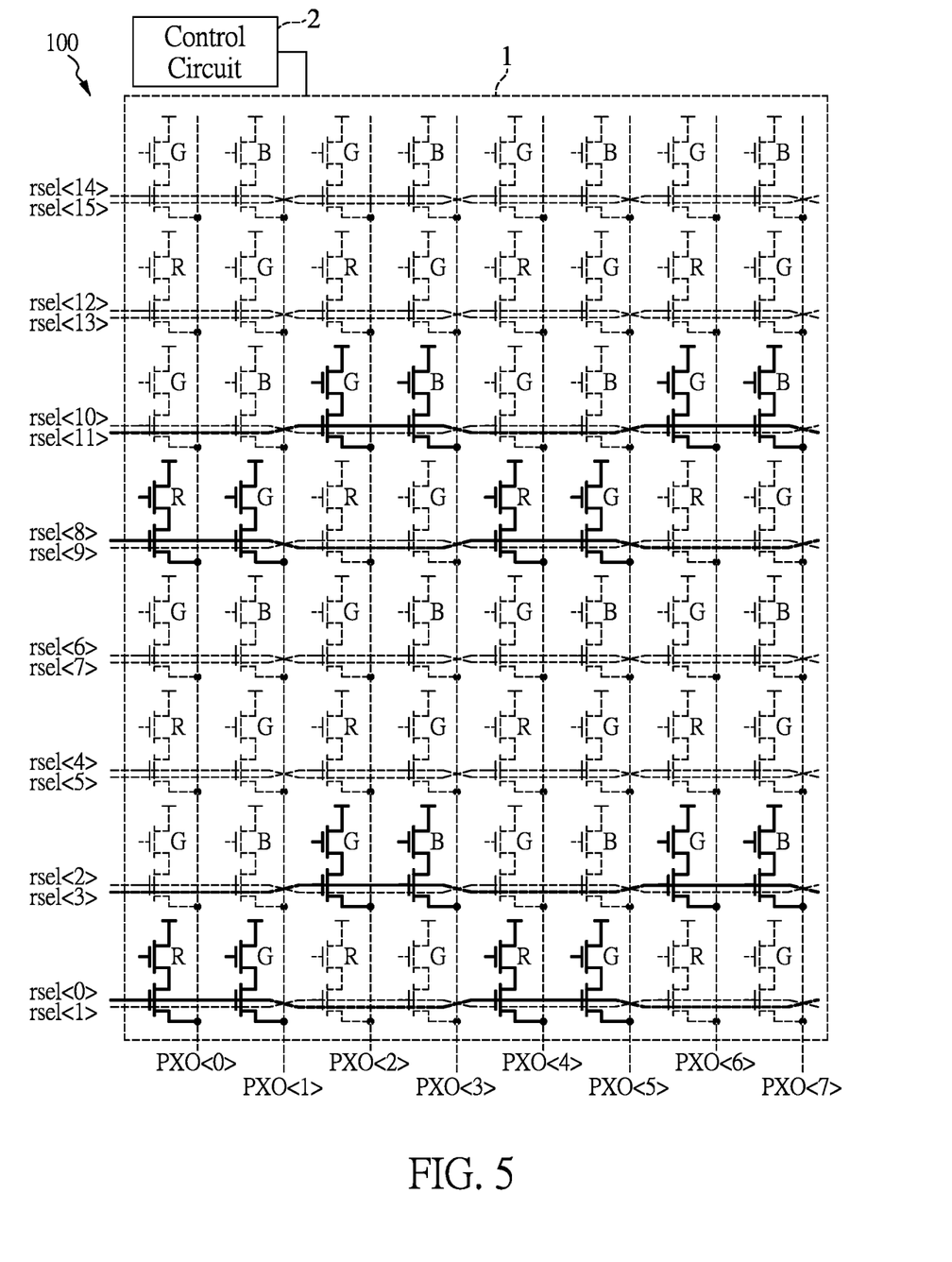
FIG. 5 is a schematic diagram showing pixels of the pixel array being selected in a first HFR readout period during the HFR readout process.

Reference is made to FIG. 5, which is a schematic diagram showing pixels of the pixel array being selected in a first HFR readout period during the HFR readout process. As shown, the selectable portion of the rows can be a half of the rows, that is, the first, second, fifth and sixth rows of the pixel array 1. Therefore, the unselectable portion can be another half of the rows, that is, the third, fourth, seventh and eighth rows of the pixel array 1.

The image sensing method proceeds to step S104: configuring the control circuit to, in each of the HFR readout periods, select the first set of the pixels of an unselected first row and the second set of the pixels of an unselected second row adjacent to the unselected first row from the selectable portion of the rows, and read out signals of the selected pixels.

It should be noted that step S104 is repeated until there is no more unselected rows can be selected from the selectable portion, and the unselectable portion of the rows, which is divided in step S102, is not able to be selected in the HFR readout process. In more detail, the selectable portion of the rows can include (1+(i−1)*4)-th ones and (2+(i−1)*4)-th ones of the rows, where i is an integer from 1 to N/4, and N is a quantity of the rows.

For example, in a first one of the HFR readout periods, the unselected first rows can be the first and fifth rows of the pixel array 1, and the unselected second rows can be the second and sixth rows of the pixel array 1. In this case, the first row is selected first, thus the first set that is selected by the control circuit 2 in the first HFR readout period can be the pixels R, G respectively connected to the readout lines PXO<0>, PXO<1>, PXO<4> and PXO<5> in the first row, and the second set that is selected in the first HFR readout period can be the pixels G, B in the second row respectively connected to the readout lines PXO<2>, PXO<3>, PXO<6> and PXO<7>. Therefore, signals of the selected pixels, which are the pixels R, G respectively connected to the readout lines PXO<0>, PXO<1>, PXO<4> and PXO<5> in the first row and the pixels G, B respectively connected to the readout lines PXO<2>, PXO<3>, PXO<6> and PXO<7> in the second row, are read out by the control circuit 2, can the control circuit 2 can obtain image data at locations corresponding to the selected pixels in a current frame.

Next, in a second one of the HFR readout periods, there is merely the fifth row left as the unselected first row, and the unselected second row can then be the sixth row of the pixel array 1. Therefore, the first set that is selected by the control circuit 2 in the second HFR readout period can be the pixels R, G respectively connected to the readout lines PXO<0>, PXO<1>, PXO<4> and PXO<5> in the fifth row, and the second set that is selected in the second HFR readout period can be the pixels G, B row respectively connected to the readout lines PXO<2>, PXO<3>, PXO<6> and PXO<7> in the sixth row.

Therefore, in the second HFR readout period, signals of the selected pixels, which now are the pixels R, G respectively connected to the readout lines PXO<0>, PXO<1>, PXO<4> and PXO<5> in the fifth row and the pixels G, B respectively connected to the readout lines PXO<2>, PXO<3>, PXO<6> and PXO<7> in the sixth row, are read out by the control circuit 2, can the control circuit 2 can obtain image data at locations corresponding to the selected pixels in a current frame.

It should be noted that, in each of the HFR readout periods, a quantity of the selected pixels corresponding to the first color (i.e., green) is greater than a quantity of the selected pixels corresponding to the second color (i.e., blue) and is greater than a quantity of the selected pixels corresponding to the third color (i.e., red). In this way, twice as many green elements as red or blue are provided in the pixel array 1 to mimic the physiology of the human eye, thereby obtaining the frame image that is closer to an effect seen by the human eyes.

Afterward, the image sensing method proceeds to step S106: obtaining an image frame. The image frame can be obtained by performing the HFR readout process in a faster way, by reducing a resolution than those of the normal readout process mentioned above. For example, if the frame rate under the resolution of 1280×800 is 60 Frame per second (FPS), then the frame rate under the resolution of 640×400 can reach 240 FPS by utilizing the image sensing device and the image sensing method provided by the present disclosure, which is also faster than the existing image sensing chip under the same resolution that is lowered.

BENEFICIAL EFFECTS OF THE EMBODIMENTS

In conclusion, in the image sensing device and the image sensing method provided by the present disclosure, the image frame can be obtained in a faster way with lowered resolution than those of the normal readout process by performing the HFR readout process, which is also faster than the existing image sensing chip under the same resolution that is lowered. It should be noted that the present invention can both be applied in multi wavelength pixels design, such as different color pixels design, and monochrome pixel design applications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An image sensing device, comprising:
   a pixel array in which pixels are arranged to form a plurality of rows and a plurality of columns;
   a plurality of first row-selecting lines corresponding to the plurality of rows, respectively, wherein a first set of the pixels of each row is electrically connected to the corresponding first row-selecting line;
   a plurality of second row-selecting lines corresponding to the rows, respectively, wherein a second set of the pixels of each row is electrically connected to the corresponding second row-selecting line; and
   a control circuit configured to, in response to a high-frame rate (HFR) mode being enabled, perform an HFR readout process to obtain an image frame, wherein the HFR readout process includes a plurality of HFR readout periods, and the plurality of rows are divided into a selectable portion and an unselectable portion for the HFR readout process;
   wherein, in each of the HFR readout periods, the control circuit is configured to select the first set of the pixels of an unselected first row and the second set of the pixels of an unselected second row adjacent to the unselected first row from the selectable portion of the rows, and read out signals of the selected pixels; and
   wherein the unselectable portion of the rows is not selected in the HFR readout process.

2. The image sensing device according to claim 1, wherein for each row, the first set of the pixels and the second set of the pixels are alternately and repeatedly arranged in a two-by-two manner.

3. The image sensing device according to claim 2, wherein for each of adjacent two of the rows, the first set and the second set in a first row each includes first pixels and second pixels that are alternately arranged, the first set and the second set in a second row each includes third pixels and fourth pixels that are alternately arranged, and the second pixels and the third pixels corresponding to a first optical wavelength.

4. The image sensing device according to claim 3, wherein the first pixels corresponding to a second optical wavelength, and the fourth pixels corresponding to a third optical wavelength.

5. The image sensing device according to claim 3, wherein the first optical wavelength is corresponding to green, the second optical wavelength is corresponding to blue, and the third optical wavelength is corresponding to red.

6. The image sensing device according to claim 3, wherein, in each of the HFR readout periods, a quantity of the selected pixels corresponding to the first optical wavelength is greater than a quantity of the selected pixels corresponding to the second optical wavelength and is greater than a quantity of the selected pixels corresponding to the third optical wavelength.

7. The image sensing device according to claim 1, wherein the selectable portion of the rows includes (1+(i−1)*4)-th ones and (2+(i−1)*4)-th ones of the rows, where i is an integer from 1 to N/4, and N is a quantity of the rows.

8. The image sensing device according to claim 1, wherein the control circuit is further configured to, in response to a normal readout mode being enabled, perform a normal readout process including a plurality of normal readout periods,
   wherein, in each of the normal readout periods, the control circuit is configured to select the first set and the second set of the pixels of an unselected row, and read out signals of the selected pixels.

9. The image sensing device according to claim 1, further comprising a plurality of readout lines electrically connected to the control circuit, wherein the readout lines corresponding to the columns, respectively, and the pixels of each column are electrically connected to the corresponding readout line.

10. The image sensing device according to claim 9, wherein each of the pixels includes:
    a photodiode; and
    a row selecting switch electrically connected between the photodiode and the corresponding readout line,
    wherein, in response to the pixel being selected, the row selecting switch is turned on, such that the signal of the selected pixel is read out by the control circuit.

11. An image sensing method adapted to an image sensing device, the image sensing device including a pixel array in which pixels are arranged to form a plurality of rows and a plurality of columns, a plurality of first row-selecting lines, a plurality of second row-selecting lines and a control circuit, the image sensing method comprising:
    configuring the control circuit to, in response to a high-frame rate (HFR) mode being enabled, perform an HFR readout process to obtain an image frame, wherein the HFR readout process includes a plurality of HFR readout periods, a first set of the pixels of each row is electrically connected to the corresponding first row-selecting line, a second set of the pixels of each row is electrically connected to the corresponding second row-selecting line, and the plurality of rows are divided into a selectable portion and an unselectable portion for the HFR readout process; and configuring the control circuit to, in each of the HFR readout periods, select the first set of the pixels of an unselected first row and the second set of the pixels of an unselected second row adjacent to the unselected first row from the selectable portion of the rows, and read out signals of the selected pixels, wherein the unselectable portion of the rows is not selected in the HFR readout process.

12. The image sensing method according to claim 11, wherein for each row, the first set of the pixels and the second set of the pixels are alternately and repeatedly arranged in a two-by-two manner.

13. The image sensing method according to claim 12, wherein for each of adjacent two of the rows, the first set and the second set in a first row each includes first pixels and second pixels that are alternately arranged, the first set and the second set in a second row each includes third pixels and fourth pixels that are alternately arranged, and the second pixels and the third pixels corresponding to a first optical wavelength.

14. The image sensing method according to claim 13, wherein the first pixels corresponding to a second optical wavelength, and the fourth pixels corresponding to a third optical wavelength.

15. The image sensing method according to claim 13, wherein the first optical wavelength is corresponding to green, the second optical wavelength is corresponding to blue, and the third optical wavelength is corresponding to red.

16. The image sensing method according to claim 13, wherein, in each of the HFR readout periods, a quantity of the selected pixels corresponding to the first optical wavelength is greater than a quantity of the selected pixels corresponding to the second optical wavelength and is greater than a quantity of the selected pixels corresponding to the third optical wavelength.

17. The image sensing method according to claim 11, wherein the portion of the rows includes $(1+(i-1)*4)^{th}$ ones and $(2+(i-1)*4)^{th}$ ones of the rows, where i is an integer from 1 to N/4, and N is a quantity of the rows.

18. The image sensing method according to claim 11, further comprising:

configuring the control circuit to, in response to a normal readout mode being enabled, perform a normal readout process including a plurality of normal readout periods; and configuring the control circuit to, in each of the normal readout periods, select the first set and the second set of the pixels of an unselected row, and read out signals of the selected pixels.

19. The image sensing method according to claim 11, wherein the image sensing device further includes a plurality of readout lines electrically connected to the control circuit, the readout lines corresponding to the columns, respectively, and the pixels of each column are electrically connected to the corresponding readout line.

20. The image sensing method according to claim 19, wherein each of the pixels includes:

a photodiode; and a row selecting switch electrically connected between the photodiode and the corresponding readout line, wherein the image sensing method further comprises:

configured the control circuit to, in response to the pixel being selected, turn on the row selecting switch, and read out the signal of the selected pixel.

* * * * *